March 29, 1966   R. H. MERKLE   3,243,018
TOGGLE ACTUATING LINK BRAKE ASSEMBLY
Filed June 1, 1964   3 Sheets-Sheet 1

INVENTOR.
Ralph H. Merkle
BY
D. D. McGrant
His Attorney

March 29, 1966   R. H. MERKLE   3,243,018
TOGGLE ACTUATING LINK BRAKE ASSEMBLY
Filed June 1, 1964   3 Sheets-Sheet 2

INVENTOR.
Ralph H. Merkle
BY
D. D. McGrand
His Attorney

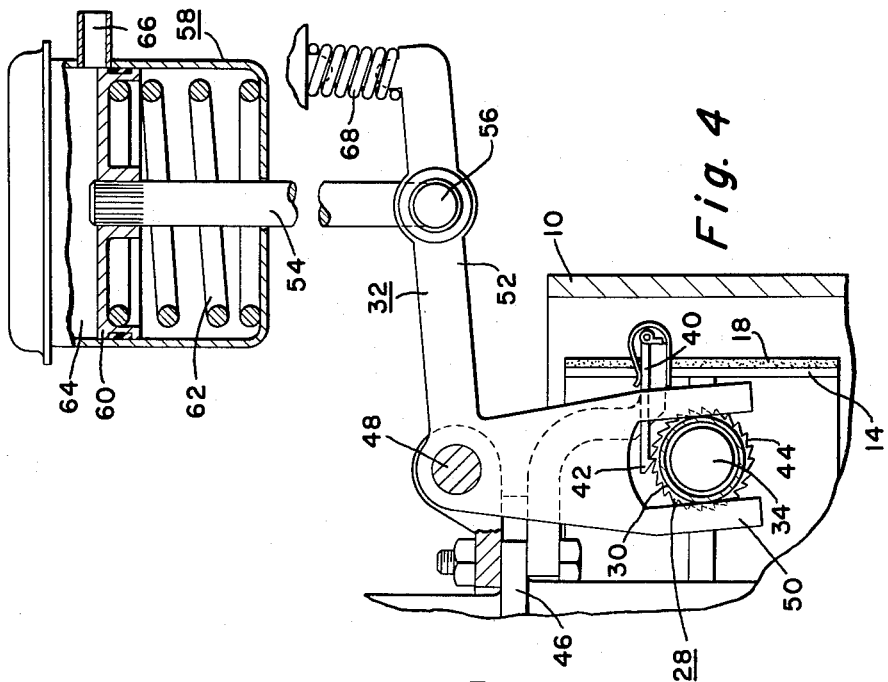
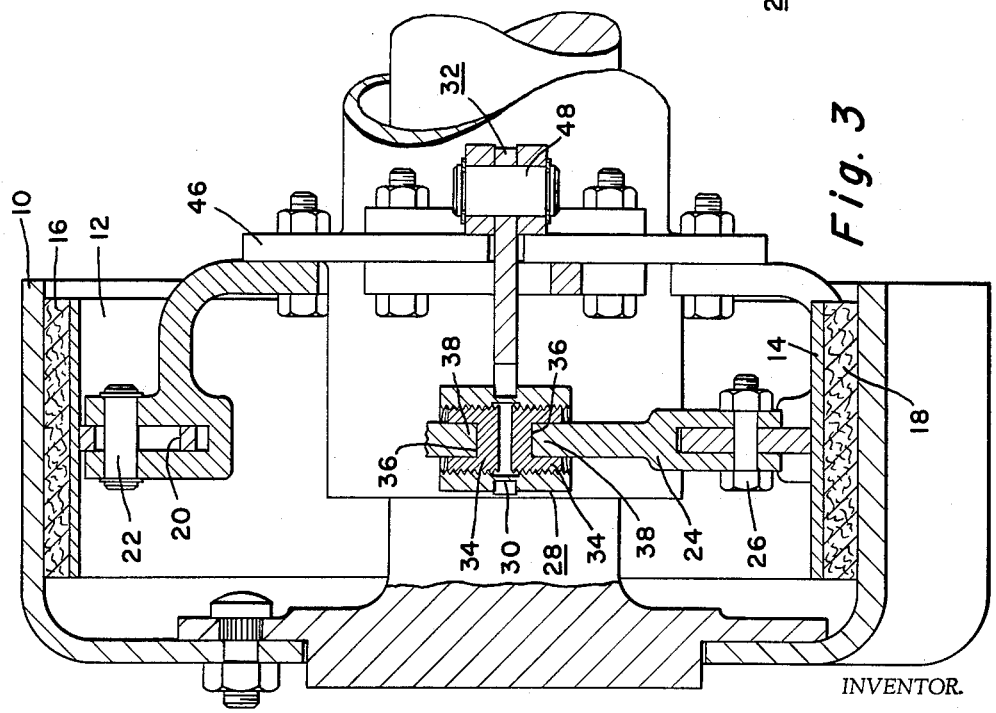

United States Patent Office 3,243,018
Patented Mar. 29, 1966

3,243,018
TOGGLE ACTUATING LINK BRAKE ASSEMBLY
Ralph H. Merkle, Milford, Mich., assignor to General Motors Corporation, Detroit, Mich., a corporation of Delaware
Filed June 1, 1964, Ser. No. 371,446
9 Claims. (Cl. 188—73)

This invention relates to brake actuating mechanisms, and more particularly to a toggle actuated brake mechanism that is responsive to air pressure.

It is an object of the present invention to provide an improved brake actuating mechanism which will be responsive to air pressure operating on a toggle linkage which will avoid the need for designing close fitting parts that involve a sliding action for brake actuation.

It is another object of the present invention to provide an improved brake actuating mechanism which will allow the design of a system which has the majority of moving parts outside of an area where great heat is likely to be generated during brake actuation.

It is a further object of the present invention to provide an improved brake actuating mechaism which will be relatively inexpensive to manufacture and will include a minimum number of parts. Further objects and advantages of the present invention will be apparent from the following description, reference being had to the accompanying drawings, wherein a preferred embodiment of the present invention is clearly shown.

In the drawings:

FIGURE 3 is a sectional view taken along line 3—3 of FIGURE 1.

FIGURE 4 is a sectional view of the air responsive mechanism of FIGURE 2, the mechanism illustrated in a configuration it would assume when air pressure is lost in the device.

Figure 1:
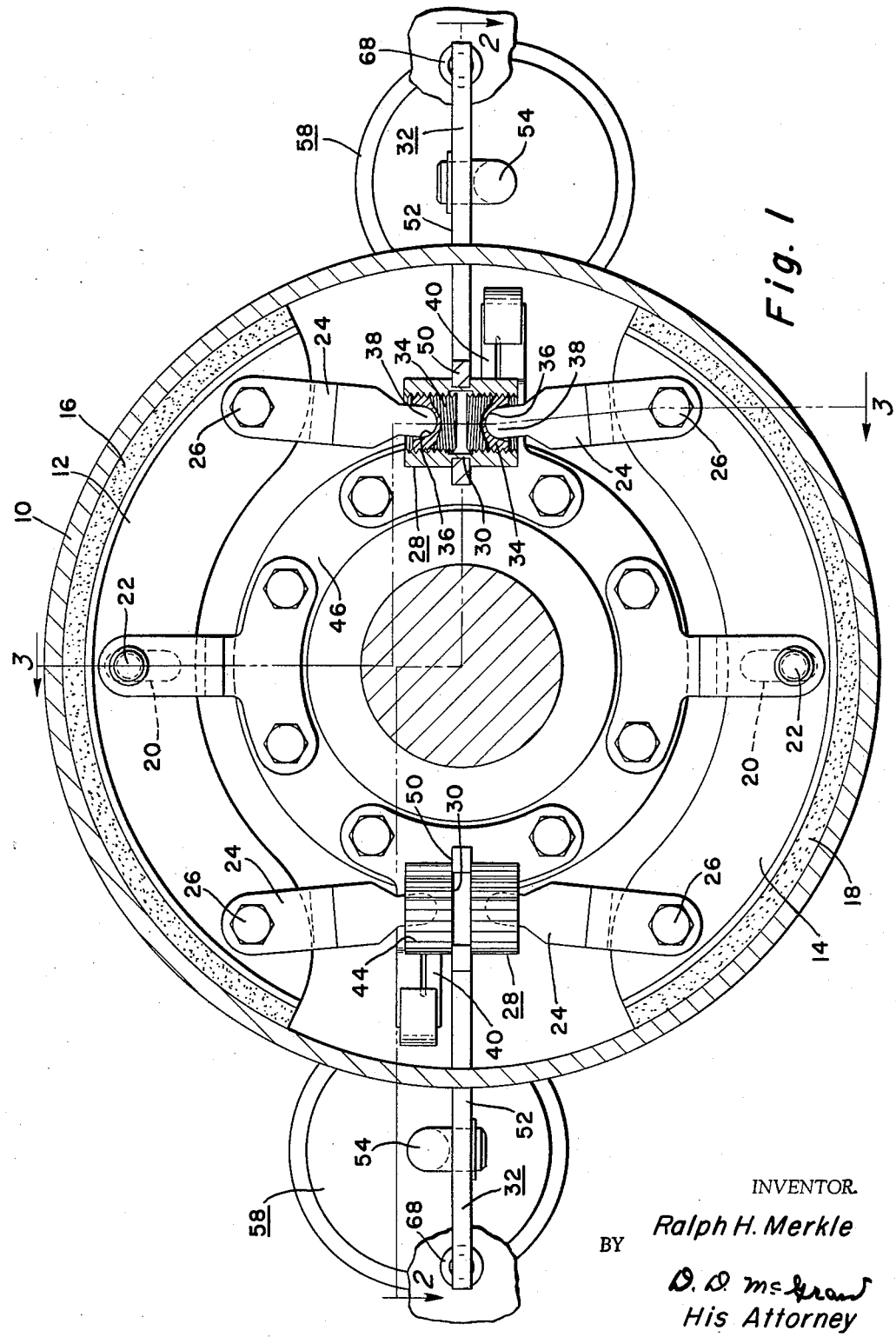
FIGURE 1 is an elevational view, with some parts in section, illustrating a brake equipped with the subject invention.

Referring now to FIGURE 1, a brake drum 10 is rotatably mounted on a wheel of a vehicle. A brake shoe 12 and a brake shoe 14 carrying linings 16 and 18, respectively, are mounted in fixed relationship with respect to the rotatable drum 10. An anchor slot 20 formed in the brake shoe 14 cooperates with an anchor pin 22 carried by a fixed portion of the vehicle. A plurality of toggle arms 24 is pivotally mounted on the brake shoes 12 and 14 at pivot points 26.

A turnbuckle sleeve 28 is disposed between opposed ends of each pair of the toggle arms 24. The outer periphery of the turnbuckle sleeve is serrated for a purpose to be hereinafter described and has a slot 30 adapted to cooperate with a bellcrank 32 during brake actuation. The interior portion of the turnbuckle sleeve 28 is threaded, a right-hand thread and a left-hand thread on either side of the sleeve center. A series of plugs 34 are adapted to cooperate with the threaded interior of the turnbuckle sleeve 28 to provide an expanding action as the turnbuckle sleeve 28 is rotated in one direction. A pocket 36 formed in the end of the plugs 34 is adapted to cooperate with an end 38 of the toggle arms 24. It is apparent that the relative position of the plugs 34 within the turnbuckle sleeve 28 establishes the fixed relation between the ends 38 of each pair of opposed toggle arms 24. If the turnbuckle sleeve 28 is rotated in one direction the plugs 34 within that sleeve are arranged to move apart, and if the sleeve 28 is rotated in the opposite direction, the plugs 34 are moved closer together.

Figure 2:
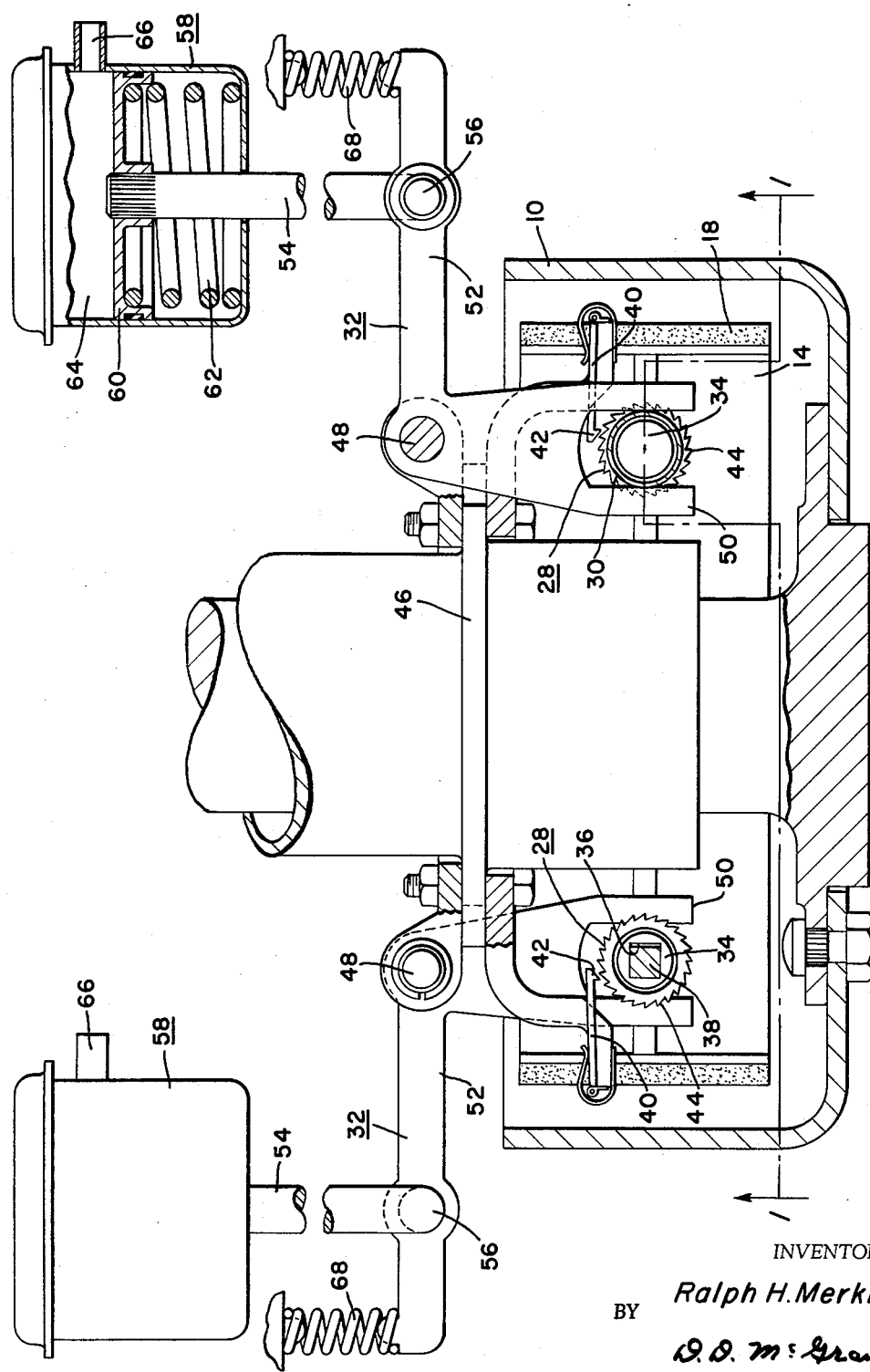
FIGURE 2 is a sectional view taken along line 2—2 of FIGURE 1.

Referring now to FIGURE 2, a spring loaded pawl 40 is pivotally mounted on a fixed poriton of the vehicle and has an end 42 adapted to cooperate with serrations 44 formed on the outer periphery of the turnbuckle sleeve 28. The bellcrank 32 is pivotally mounted on an axle flange 46 at point 48 and has a substantially U-shaped end 50 arranged to cooperate with the slot 30 formed on the outer periphery of the turnbuckle sleeve 28. The bellcrank 32 has an arm 52 extending at substantially right angles to the U-shaped end 50 and pivotally engages a piston rod 54 at point 56.

An air responsive device generally designated by the numeral 58 includes a piston 60 slidably disposed for translation movement within the air responsive device 58. The piston rod 54 engages the piston 60 in a manner making it non-rotatable with respect thereto. The piston 60 is biased away from one wall of the air responsive device by a spring 62 and is acted upon on another surface by air pressure entering the chamber 64 through an inlet 66 from an air pressure source, not shown. A spring 68 is disposed between an extreme end of the arm 52 and a fixed portion of the vehicle in a manner that will prevent lateral loads from being exerted on the piston 60 and also serves as a return spring for the brake shoes after a brake actuation.

In operation an air pressure is normally present in the chamber 64. This air pressure is of sufficient magnitude to depress the spring 62 into a configuration shown in FIGURE 2. This is hereinafter referred to as a poised position and all of the parts in the actuating mechanism are in a poised position while air pressure of a sufficient mganitude to depress the spring 62 is present in the chamber 64.

If it is desired to actuate the brakes, pressure is relieved from the chamber 64 in any well-known manner thereby allowing the spring 62 to extend and drive the piston 60 leftwardly as viewed in FIGURE 2 into a position as viewed in FIGURE 4. Referring now to FIGURE 4, the bellcrank 32 has pivoted on the point 48 and has drawn the turnbuckle sleeve 28 upwardly as viewed in FIGURE 4. It is understood that the turnbuckle sleeve 28 is thereby moved in the direction of the brake drum 10.

Referring now to FIGURE 1, the effect of the moved turnbuckle sleeve 28 is clearly illustrated. The arms 24 as previously stated are pivotally mounted on the brake shoes 12 and 14 at points 26. It is seen in FIGURE 1, wherein the arms 24 are illustrated in the poised position that, in the poised position, an angular relationship is established between the center line of the toggle arms 24 viewed with respect to their longitudinal axis. This angular relationship of the arms 24 in the poised position is designed to provide a toggling action against the brake shoes 12 and 14 when the arms 24 are pivoted around the points 26 in the direction of the brake drum 10.

As previously stated in the description of the operation, the turnbuckle sleeve 28 has been moved towards the drum 10. As this occurs the brake shoes 12 and 14 are driven outwardly until the brake linings 16 and 18 engage the drum 10. Presuming the brake drum 10 to be rotating, a frictional engagement between the linings 16 and 18 takes place with the drum and a braking action results. It is apparent that the magnitude of the braking action will be determined by the degree to which the chamber 64 is lowered in pressure. The maximum braking action available is determined by the strength of the spring 62.

Referring to FIGURE 1, the turnbuckle and plug cooperation is herein referred to as an adjusting means and is necessary in order to maintain a predetermined angular relationship of the longitudinal axes of the arms 24 in the poised position as the brake linings 16 and 18 wear. Referring to FIGURE 4, this is accomplished by a movement of the turnbuckle sleeve 28 in the direction of the brake drum 10 during a brake actuation. The pawl 40 is designed to be spring loaded in the direction of the turnbuckle sleeve 28 and the end 42 constantly bears against the serrations 44 on the outer periphery of the sleeve 28. If movement of the sleeve 28 towards the drum 10 during brake actuation is of sufficient magnitude to allow the end 42 of the pawl 40 to engage another serration on the sleeve 28, a return movement of the sleeve 28 after brake actuation to a poised position will result in a rotation on its axis of the sleeve 28. Referring to FIGURE 1, a rotation of the sleeve 28 in a predetermined direction will cause the plugs 34 to move towards the outer portion of the sleeve 28 thereby moving the arms 24 into a position where the ends 38 are spaced further apart. The number of serrations on the sleeve 28 are calibrated to the thickness of the brake linings 16 and 18 in a manner allowing the space between the linings and the brake drum in a poised position to be maintained during brake wear.

Referring now to FIGURE 2, assuming the linings 16 and 18 have been in engagement with the drum 10, an increase in pressure in the chamber 64 will compress the spring 62 and pivot the bellcrank 32 around the point 48 and return the brake shoes to a poised position. It is therefore obvious that the actuating mechanism previously described is responsive to a decrease in air pressure for actuation and an increase in air pressure for a return to a poised position.

It is usually desirable to have a separate air responsive device acting on either end of the brake shoes 12 and 14 thereby effecting a straight line engagement of the linings 16 and 18 with the drum 10. The slot 20 cooperating with the pin 22 assures this straight line engagement and therefore even force distribution from either of the air responsive devices 58 on the brake shoes is practically assured. To explain further, a type of servo action around the pin 22 is engendered as the portion of the linings extending on either side of the slot 20 makes contact with the rotating drum. As this occurs a pivoting of the shoes 12 or 14 around the pin 22 can result which will automatically balance the forces applied to the rotating drum as the forces exerted by the springs 62 on the bellcrank 32 are precisely equal.

The actuating mechanism previously described finds particular utility in air brakes of heavy duty vehicles. Many heavy duty vehicles enter operative environments during operation thereof which make the braking systems thereof exposed very frequently to dirt and foreign materials. The subject mechanism is so constructed to allow one end of the bellcrank to extend into the braking area and therefore minimize the amount of dirt accumulation that can occur in the area where the braking takes place. This, of course minimizes the possibility of dirt accumulation and consequently the heat build-up on operative parts.

It is noted that the major moving parts, namely the bellcrank and the piston rod, are arranged to move pivotally which permits the use of sealed bearings. These sealed bearings can be made relatively impervious to dirt and therefore can be relied on for long term trouble-free operation.

It is likewise noted that a toggle mechanism can develop great mechanical advantage in operation and therefore a very effective frictional engagement of linings to drum can be effected. In heavy duty vehicles this force of multiplication is very important and permits safe operation of the vehicles in unfavorable environments.

While the embodiment of the present invention as herein disclosed, constitutes a preferred form, it is to be understood that other forms might be adopted.

What is claimed is as follows:

1. Actuating mechanism for vehicle brakes including a plurality of brake shoes engageable with a rotating drum, said mechanism comprising: spring operable means having a retaining means and being carried by a fixed portion of the vehicle; lever means pivotally mounted and adapted to be driven by said spring operable means; toggle means engaging said lever means and a plurality of brake shoes; and turnbuckle means engaging said toggle means and being adapted to maintain said toggle means in an operative disposition, said spring operable means being responsive to a releasing of said retaining means to pivot said lever means thereby actuating said toggle means to drive a plurality of brake shoes into engagement with a rotating drum.

2. Actuating mechanism for vehicle brakes having a plurality of expandable brake shoes engageable with a rotating drum, said mechanism comprising: spring operable means retained in a poised position by air pressure acting on a portion thereof and carried by a fixed portion of the vehicle; lever means pivotally carried by a fixed portion of the vehicle and adapted to be pivoted by said spring operable means; toggle means arranged to expand the plurality of brake shoes into engagement with the rotating drum; and adjusting means carried by the toggle means and engaging said lever means and the toggle means to maintain the toggle means rigid with respect to the lever means, said spring operable means being releasable from the poised position by the release of the air pressure acting thereon whereby the lever means is pivoted thereby carrying the toggle means into expanding disposition and applying the brake shoes to the rotating drum in a braking manner.

3. An actuating mechanism according to claim 2 wherein the spring operable means is a fluid tight chamber having a slidable piston disposed therein separating the chamber into two compartments, a first compartment being in fluid communication with an air pressure source and a second compartment containing a spring biasing the piston toward the first compartment, said piston engaging a rod which is operatively associated with said lever means.

4. An actuating mechanism according to claim 2 wherein the lever means is a bellcrank pivotally mounted on a fixed portion of the vehicle, said bellcrank having a U-shaped portion peripherally engaging the adjusting means for driving the toggle means and said adjusting means into brake actuating disposition.

5. An actuating mechanism according to claim 2 wherein the toggle means includes a plurality of arms pivotally mounted in spaced end to end relation on an inside surface of the brake shoes, and adjusting means arranged to engage the arms and maintain them in expanded end to end relationship, said plurality of arms adapted to produce a force at right angles to a thrust in response to a pivoting movement of said lever means whereby the brake shoes are expanded into frictional engagement with the rotating drum.

6. An actuating mechanism according to claim 5 wherein the adjusting means is carried by the toggle means and is a turnbuckle comprising: a sleeve having serrations on an exterior portion and a threaded interior, a pawl carried by a fixed portion of the vehicle and arranged to cooperate with the serrations on the sleeve to rotate said sleeve during a releasing movement of the toggle means, and a plurality of threaded plugs arranged to move in opposite directions on the threaded interior of the sleeve as the sleeve is rotated thereby varying the spaced end to end relationship of the toggle arms, the varying of the spaced end to end relationship of the toggle arms serving to change the effective length of the toggle arms as the brake linings of the vehicle wear and a greater distance exists between the brake drum and the brake shoes in the poised position.

7. Actuating mechanism for vehicle brakes having expandable brake shoes adapted to frictionally engage a rotatable drum, said mechanism comprising: piston means including a rod therefor slidably mounted in a cylinder, said piston means being biased by a spring against air pressure on another surface of the piston means that tends to maintain the spring in a depressed condition when the brakes are poised; a bellcrank pivotally mounted on a fixed portion of the vehicle and having one end engaging the piston rod; toggling arms pivotally mounted on brake shoes with opposite ends of the arms disposed in spaced relationship in and adapted to be driven by the pivotable bellcrank to move the brake shoes into frictional engagement with the rotatable drum to effect a braking action; and adjusting means disposed between the ends of the arms to vary their spaced relationship as the brake linings of the brake shoes wear, said brakes being actuated by air pressure being decreased in said cylinder whereby the spring drives the piston means and the rod in one direction which in turn pivots the bellcrank into engagement with said adjusting means thereby actuating the toggling arms, said adjusting means including a rotatable turnbuckle adapted to be rotated by means carried by a fixed portion of the vehicle as the brakes are released and the arms are carried by an untoggled disposition by a pivoting bellcrank as air pressure is increased in the cylinder.

8. Actuating mechanism for vehicle brakes having a plurality of brake shoes adapted to be driven into frictional engagement with a rotatable drum, said mechanism comprising: pivotable arms carried by brake shoes arranged in juxtaposition to a rotatable drum, said pivotable arms arranged in end to end spaced disposition in angular alignment with each other; adjusting means including a sleeve externally serrated and internally threaded disposed between the ends of the pivotable arms and adapted to vary the spaced relationship between said arm ends as the brake linings of the brake shoes wear thereby maintaining the angular alignment of the pivotable arms; crank means for engaging said adjusting means and adapted to move said sleeve and the pivotable arms in a toggling movement to drive the brake shoes into frictional engagement with the rotatable drum; and air operable means including a piston carrying a piston rod engaging the crank means acted upon on one side by air pressure and on another side by a spring, said piston responsive to a decrease in air pressure to be moved by the spring in one direction whereby the crank means pivots and moves the sleeve and arms into a toggled disposition to energize the vehicle brakes, said piston being responsive to an increase in air pressure to compress the spring and pivot the crank means whereby the sleeve and arms are brought to an untoggled disposition to release the vehicle brakes, said serrated sleeve surface cooperating with a pawl member fixedly carried by the vehicle to adjust the spaced relationship of the pivotable arm ends during the release of the vehicle brakes to compensate for brake lining wear.

9. An actuating mechanism according to claim 8 wherein the pivotable arm ends opposite the ends engaging the brake shoes are operatively associated with a pair of oppositely threaded members cooperate the interior threaded portion of the sleeve in a turnbuckle action to vary the spacing of the pivotable arm ends during brake release.

References Cited by the Examiner
UNITED STATES PATENTS

| | | | |
|---|---|---|---|
| 1,957,891 | 5/1934 | Kazenmaier | 188—170 X |
| 2,140,741 | 12/1938 | Goepfrich | 188—152 X |
| 2,152,105 | 3/1939 | Tatter | 188—152 |

DUANE A. REGER, *Primary Examiner.*